(12) United States Patent
Bluemcke et al.

(10) Patent No.: US 6,812,451 B2
(45) Date of Patent: Nov. 2, 2004

(54) OPTICAL SENSOR FOR USE IN HIGH VACUUMS

(75) Inventors: Thomas Bluemcke, Emmendingen (DE); Ingolf Hoersch, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/133,204

(22) Filed: Apr. 26, 2002

(65) Prior Publication Data

US 2004/0011949 A1 Jan. 22, 2004

(30) Foreign Application Priority Data

Apr. 30, 2001 (DE) .......................................... 101 21 185

(51) Int. Cl.[7] .............................................. G06M 7/00
(52) U.S. Cl. ..................... 250/221; 250/222.1; 250/239; 362/267
(58) Field of Search ................................ 362/267, 158; 250/221, 222.1, 216, 239, 208.1, 214.1; 345/555–557; 257/80–85, 431–435

(56) References Cited

U.S. PATENT DOCUMENTS 4,207,464 A * 6/1980 Fukuyama et al. ......... 250/239
4,394,572 A * 7/1983 Wilber ....................... 250/239
5,302,818 A * 4/1994 Pezant ....................... 250/216
5,691,536 A * 11/1997 Shimoyama et al. .......... 438/7

FOREIGN PATENT DOCUMENTS

| DE | 110581 | 3/1974 |
| DE | 3823044 A1 | 2/1987 |
| DE | 4123589 C2 | 1/1993 |
| DE | 19713928 C1 | 4/1998 |
| GB | 2290378 A | 12/1995 |

* cited by examiner

Primary Examiner—Stephone B. Allen
Assistant Examiner—Patrick J. Lee
(74) Attorney, Agent, or Firm—Townsend and Townsend and Crew LLP

(57) ABSTRACT

An optical sensor for use in high vacuum plants and/or in ultrahigh vacuum plants has a metal housing surrounding an interior space in a manner substantially impermeable to gas in which a window which transmits light to be detected is provided and an optical sensor element arranged in the interior space for the detection of light to be detected which is incident through the window.

20 Claims, 1 Drawing Sheet

OPTICAL SENSOR FOR USE IN HIGH VACUUMS

BACKGROUND OF THE INVENTION

The present invention relates to an optical sensor, in particular for use in connection with high vacuum plants or ultrahigh vacuum plants.

In the following a high vacuum is understood as a vacuum with a residual gas pressure of less than $10^{-5}$ mbar and an ultrahigh vacuum as a vacuum with a residual gas pressure of less than $10^{-8}$ mbar.

High vacuum plants and ultrahigh vacuum plants are frequently used to produce, to treat or to examine articles whose surfaces must not be contaminated in these processes. The density of atoms or molecules in the plant is kept very low by the high vacuum so that only a few such atoms or molecules are deposited on the surface of the articles within a given period of time and thus contamination by undesired atoms or molecules is avoided. However, it can also come about that molecules are degassed from contaminated surfaces or from articles in such a high vacuum plant or ultrahigh vacuum plant and thus result in an increase in the density of unwanted atoms or molecules in the vacuum, For this reason, all possible parts which are not required in such a high vacuum plant or ultrahigh vacuum plant are arranged outside the plant to avoid contamination.

In this connection, particularly high demands are frequently made in the manufacture of wafers or microchips since the rejects connected with contamination result in very high costs.

When surfaces are examined in high vacuum or in ultrahigh vacuum, optical sensors are frequently used. Furthermore, optical sensors are also used to monitor handling in manufacturing processes of wafers or microchips, i.e. to monitor the transport and/or the positioning of these products, for example for light barriers or light sensors. To avoid contamination, in particular by the actual sensor elements such as photo-transistors, the sensors, and also the light sources, are generally arranged outside the high vacuum plant or the ultrahigh vacuum plant, with light being able to pass from the unit to the outside or from the outside into the unit through corresponding windows in the plant.

Due to the arrangement of the optical sensors outside the high vacuum plant or the ultrahigh vacuum plant, a comparatively large distance results between the optical sensor and the articles scanned, i.e. the article from which the light received by the optical sensor is transmitted, which results in a low detection precision. Furthermore, a complex holder of the optical sensor is required. Finally, windows are required for the optical sensors in the chamber of the high vacuum plant or of the ultrahigh vacuum plant, which can cause an increased effort in the building of the plant and further possible leak sources or which can result in the sensors not always being able to monitor the most favorable position for the examination in the plant.

SUMMARY OF THE INVENTION

It is therefore an object of the invention to provide an optical sensor which is suitable for monitoring even poorly accessible regions of a high vacuum plant or of an ultrahigh vacuum plant and which is simple to hold.

An optical sensor in accordance with the invention has a metal housing with a window permeable to the light to be detected. This metal housing with the window surrounds in a manner substantially impermeable to gas an interior space in which an optical sensor element is arranged for the detection of light to be detected which is incident through the window. A metal housing with window, from which no gas atoms or gas molecules at all exit at the pressures typical for high vacuum or ultrahigh vacuum of between $10^{-5}$ mbar and $10^{-10}$ mbar, is difficult to realize in practice; at least very low gas amounts exit over the course of time, in particular along the contact line between the metal housing and the window. Such low gas amounts can be tolerated in high vacuum plants or ultrahigh vacuum plants if the gas molecules which escape can again be pumped out of the plant, in which the sensor is used, with sufficient speed. "Substantially impermeable to gas" is therefore understood to mean that at most insubstantial gas amounts exit the housing, including the window, for outer pressures within a predetermined application range below $10^{-5}$ mbar. The leak rate of gases from the interior space within the predetermined application range below $10^{-5}$ mbar should preferably be lower than $10^{-7}$ mbar·l/s, particularly preferably lower than $10^{-9}$ mbar·l/s.

The metal housing is preferably produced from a metal which has only a very low sublimation rate in vacuum, whereby contamination of a high vacuum or of an ultrahigh vacuum by vaporizing atoms is reduced as far as possible. Furthermore, the metal should have sufficient strength to be able to absorb the forces arising due to the pressure difference between the interior space of the sensor and a high vacuum or an ultrahigh vacuum.

The window can generally be produced from any material permeable to the light to be detected and sufficiently impermeable to gas, e.g. from a corresponding glass, with further coatings on the side facing the interior space, for example, being able to be provided to avoid reflections, for example.

The sensor elements can be any preferred sensor elements which are sensitive for the light to be received and to be detected and which provide electrical signals corresponding to the light received. In particular, photo-resistors, photo-diodes, photo-transistors or CCD elements, optionally with integrated optical components, can be used. Due to the encapsulating of the sensor element in the metal housing, the selection of a suitable sensor element can take place irrespective of whether this would give off contaminating atoms or molecules to a large extent in a high vacuum or an ultrahigh vacuum.

A significant advantage of the sensor in accordance with the invention lies in the fact that to a substantial extent it can be used at virtually any position within a high vacuum plant or an ultrahigh vacuum plant due to its impermeability to gas, with no special windows having to be provided in the plant for its use. Furthermore, the installation within the plant allows a lesser distance between the sensor and the article to be scanned, which allows a higher detection precision both with respect to the spatial resolution and to the sensitivity towards interfering light. At the same time, high strain on the high vacuum plant or the ultrahigh vacuum plant due to possible atoms or molecules exiting the sensor element is largely avoided.

To keep the discharge of gases to the outside from the interior space of the sensor as low as possible, the window must be secured in a corresponding opening of the metal housing in a manner which is as impermeable to gas as possible. For this purpose, the window preferably has a region of metallized glass in which it is soldered to the metal housing. In this way, a particularly good tightness is ensured even with particularly low outside pressures. For this purpose, the use of Kovar® as the glass closing alloy for the housing is particularly suitable for a window of quartz glass.

The window can also be glued in. Furthermore, the surfaces of the glass for the window and the metal of the housing can be worked so precisely that a forcing open is possible.

Furthermore, the securing of the window in the metal housing can preferably be made such that it is self-sealing when the pressure in the interior space of the sensor is larger than that outside. This can, for example, take place in that the window is set against the metal housing from the inside such that the interior pressure presses the window against the wall of the metal housing and the seam position is thus better sealed. In this connection, the sealing effect particularly occurs at very high pressure differences between the interior space and the exterior space so that such sensors are particularly suitable for use in ultrahigh vacuum plants.

To increase its tightness, the metal housing is preferably made in one piece, but can also be made of many parts.

For the better focusing of the light incident through the window, image forming optical components such as lens elements or diaphragms, as well as, optionally, tube parts carrying these, can be arranged in the interior space between the window and the sensor element. In this way, a larger direction selectivity of the sensor can be obtained, on the one hand, and, with a given sensitivity of the sensor element, the overall sensitivity of the optical sensor can be increased by focusing, on the other hand. Filtering optical components such as polarizing filters or color filters can further be provided in the interior space. In particular when used in conjunction with reflection light barriers, in which light is radiated onto a reflector and reflected from there onto the sensor, the use of such polarization filters can avoid a malfunction in the detection of reflecting articles when polarizing reflectors, or such which rotate the polarization plane of the light through 90° on reflection, are used.

An electronic circuit connected to the optical sensor element can be provided in the interior space to process the signals provided by the sensor element in dependence on the light received. This has the advantage, on the one hand, that the optical sensor is very compact and can be installed easily and that no further components have to be provided in the high vacuum plant or in the ultrahigh vacuum plant or also outside the plant. Furthermore, interference effects through external electrical fields can thus be largely avoided.

The electronic circuit is preferably arranged on a printed circuit board, in particular a ceramic printed circuit board, which is thermally connected to the metal housing for heat dissipation. These can be either rigid printed circuit boards or also flexible circuits. The metal housing and its securing device are particularly preferably made such that very good heat dissipation results via the securing of the sensor in the high vacuum plant or the ultrahigh vacuum plant. The metal housing can in particular be made such that it can be secured at a flange in a high vacuum plant or in an ultrahigh vacuum plant while forming a thermal contact. This can be done in that the housing can be secured to the flange while forming a thermal contact area or in that a flexible strand made of a highly conductive metal such as copper is secured to the metal housing and is formed for securing to the high vacuum plant or to the ultrahigh vacuum plant. Such connections are particularly advantageous since, in high vacuum or in ultrahigh vacuum, convective heat dissipation of the waste heat produced by the sensor is insignificant so that otherwise overheating would be possible.

The gas impermeability is potentially reduced by every opening in the metal housing, even ones which are also optionally closed again. For this reason, as few leads as possible should preferably lead through the wall of the metal housing for the power supply of the sensor element and, optionally, of the electronic circuit.

A battery or an accumulator can therefore preferably be arranged in the interior space for the energy supply of the optical sensor, whereby leads leading into the metal housing, and thus corresponding openings in the housing which have to be sealed, are avoided so that the impermeability of the optical sensor to gas is not impaired.

Furthermore, devices can preferably be provided in the interior space of the optical sensor for the avoidance of signal leads from the housing of the optical sensor in order to transmit signals of the sensor element, or signals of the sensor element processed and emitted by the circuit, from the metal housing to the exterior in a wireless manner. In this connection, in particular a transmission via corresponding optical interfaces, e.g. while using correspondingly selected LEDs, can be considered. In addition to the uncoupling of the light of an LED through the window, the transmission through a light guide glazed into the housing can in particular also be especially preferred.

If the optical sensor is only used for a brief period, it can be advantageous to provide storage elements in the interior space for the storage of signals of the sensor element or of the electronic circuit during the operation of the sensor. The stored data can then be read after the removal of the sensor from the high vacuum plant or from the ultrahigh vacuum plant and the opening of the metal housing so that signal leads, and openings in the metal housing connected therewith which could reduce tightness, are also avoided here.

An optical sensor in accordance with the invention is preferably made such that it is resistant to temperatures such as occur during the heating of a high vacuum plant or of an ultrahigh vacuum plant. The typical temperature range in this connection lies between 50 to 150° C. The sensor element and, optionally, optical components and the electronic circuit must in particular be made accordingly.

Since, as set forth above, a perfect tightness of a metal housing with an inserted window is hardly possible to attain, and therefore gas, albeit a very low amount of gas, can always escape from the optical sensor under high vacuum or under ultrahigh vacuum, the internal space is preferably filled with an inert gas such as argon or nitrogen. This has the advantage that any escaping gas atoms or gas molecules do not easily react with the surface of an article disposed in the high vacuum or in the ultrahigh vacuum or are strongly adsorbed thereon, whereby they represent only less serious contamination.

The interior space of the optical sensor in accordance with the invention is particularly preferably filled with a gas whose diffusion rate is lower than that of nitrogen. Since the leak rate from the metal housing with the window is substantially defined by the diffusion rate of the exiting gas, the leak rate can be substantially reduced by the use of argon, for example, as the filling with respect to a filling with air which contains nitrogen for the larger part, whereby the vacuum is influenced less strongly when the sensor in accordance with the invention is used in a high vacuum plant or in an ultrahigh vacuum plant.

A further reduction of the leak rate can be achieved in that the pressure in the interior space of the metal housing is reduced with respect to the pressure at normal conditions, with a pressure below 0.1 bar being particularly preferred.

The sensors in accordance with the invention are particularly suitable for use for light barriers or light scanners in high vacuum plants or in ultrahigh vacuum plants, e.g. in the area of wafer and chip manufacture and in the area of surface coating technology. If such light barriers operate according to the one-way principle, the light sources can be used in corresponding metal housings with windows substantially impermeable to gas, as were described for the optical sensor, since they can then also be installed into a high vacuum plant or into an ultrahigh vacuum plant. Generally, however, the use of light sources outside the high vacuum plant or the ultrahigh vacuum plant is also possible.

However, a light source for the radiant emittance of light from the window is preferably provided in the interior space of an optical sensor in accordance with the invention such that this optical sensor can be used as a reflection light scanner or for a reflection light barrier. The light source is preferably a cold light source such as LEDs for the limiting of the waste heat.

In another embodiment, the light of the light source arranged in the interior space can also be radiantly emitted through a second window in the metal housing transparent for the light of the light source. This has the advantage that no light can reach the sensor element directly from the light source due to multiple reflection through the window.

The two embodiments mentioned in the last two paragraphs have the great advantage that only one metal housing has to be inserted into the high vacuum plant or into the ultrahigh vacuum plant, which therefore generally simplifies installation. In particular, however, in this way the orientation of the light source on the sensor element is also greatly simplified, which is in particular of substantial advantage for the use of light barriers or light sensors with masking of the foreground and/or of the background.

An image forming optical component is preferably arranged between the light source and the window. In this connection, it can in particular be a light-bundling component, whereby, on the one hand, more light can be directed onto a certain spatial region and, on the other hand, unwanted scattered light in other regions is avoided. The component can, however, also be designed, for example, for a masking of foreground and/or background. In particular lenses, e.g. of glass or plastic, can be used as image forming components.

For an optical sensor in accordance with the invention having a light source arranged in the interior space, the light paths between the window and the sensor element and between the window and the light source are preferably optically separated at least in part by non-transparent partition walls in the interior space such that scattered light emitted by the light source is largely screened with respect to the sensor element.

For this purpose, a one-piece tube is provided which moreover, optionally, serves as a holder for lenses which are, optionally, arranged in front of the light source and/or in front of the sensor element for focusing the received light onto the sensor element. In this way, a particularly simple design results which, moreover, in the case that the tube carries lenses, also allows a particularly accurate adjustment of the lenses with respect to one another.

Furthermore, a one-piece image forming or filtering optical component can preferably be provided in the interior space for influencing light transmitted by the light source, e.g. for bundling, and light received by the sensor element, e.g. for focusing. A particularly simple assembly of the image forming or filtering optical components is made possible in this way such that an accurate positioning, and thus a high detection precision, is possible in particular with very small components. Furthermore, in this way, a particularly compact construction is made possible which substantially facilitates installation into a high vacuum plant or into an ultrahigh vacuum plant.

A further subject of the invention is an optical transmitter for use in high vacuum plants and/or in ultrahigh vacuum plants having a metal housing which surrounds an interior space in a manner substantially impermeable to gas and in which a window which transmits light to be detected is provided, and having a light source arranged in the interior space for the radiant emittance of light through the window.

Such an optical transmitter can be installed into a high vacuum plant or into an ultrahigh vacuum plant for the setting up of light barriers or of light sensors without putting a strain on the vacuum, with a usual optical sensor being able to be used outside the plant or, preferably, a sensor in accordance with the invention being able to be used inside the plant as the associated optical sensor.

A preferred embodiment of the invention will now be described by way of example with reference to the drawings.

DESCRIPTION OF THE PREFERRED EMBODIMENTS

Figure 1:
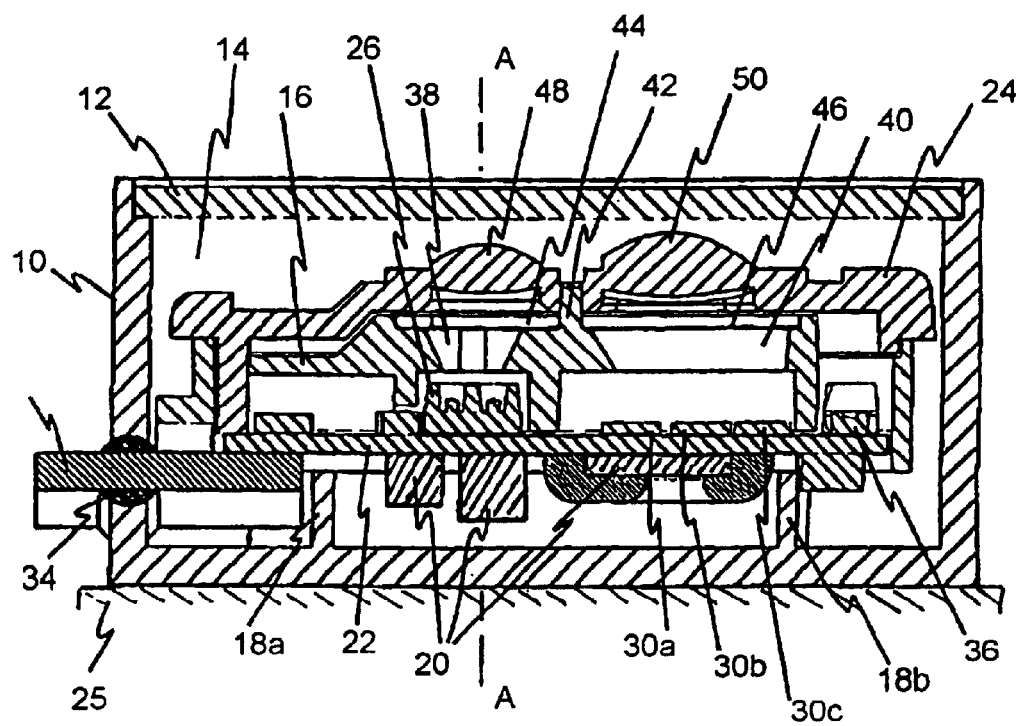
FIG. 1 is a longitudinal section through an optical sensor in accordance with a preferred embodiment of the invention.
Figure 2:
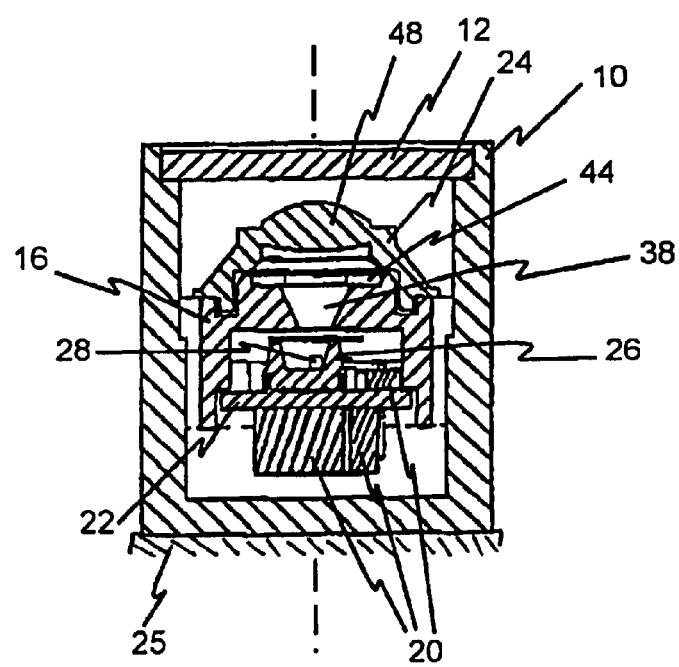
FIG. 2 is a cross-section through the optical sensor in FIG. 1 through the plane in FIG. 1 indicated by the broken line AA.

An optical sensor in accordance with a preferred embodiment of the invention shown in FIGS. 1 and 2 has a metal housing 10 made of stainless steel into which a window 12 of glass is inlet in a manner impermeable to gas. The metal housing 10 and the window 12 surround an interior space 14 in which a tube body 16, which is secured in a manner not shown on webs 18a and 18b of the metal housing 10, carries an electronic circuit 20 on a printed circuit board 22 and a one-piece lens arrangement 24 made of a plastic with a high refractive index such as Ultrason® (BASF AG, Ludwigshafen, Germany).

The window 12 is metallized at its edge regions where it abuts the metal housing 10 and is there connected to the metal housing 10 via a solder joint substantially impermeable to gas.

The interior space 14 is filled with air under normal pressure.

The metal housing 10 has tapped bores not shown in the Figures at its side disposed opposite the window and is secured by means of these to a flange 25 of a high vacuum plant or of an ultrahigh vacuum plant. A very good heat transfer from the sensor to the flange 25 is ensured by the contact area between the lower side of the housing and the flange 25.

The printed circuit board 22 carries an electronic circuit 20 as well as, connected thereto, a light source 26 with an LED 28 (cf. FIG. 2) and three photo-diodes 30a, 30b and 30c as sensor elements. The electronic circuit serves, among other things, for the selection of the light source 26 and for the power supply of the sensor elements 30a, 30b, 30 and for the processing of the signals provided by these sensor elements on the reception of light. The electrical connection of the circuit to the exterior of the housing takes place via contact pins 32 made of metal which are melted in glass 34 into corresponding openings of the metal housing 10 in a manner impermeable to gas. Furthermore, a light source 36 selected by the electronic circuit 20 is provided with an LED which lights up when the sensor elements 30a, 30b, 30c receive light.

A funnel-shaped opening 38 is worked into the tube body 16, which is extruded from black tinted plastic (PBT-GF, i.e. glass fiber-reinforced), over the light source 26 and an opening 40 is worked in over the sensor elements 30a, 30b and 30c such that the light paths for light transmitted by the light source 26 and light received by the sensor elements 30a, 30b and 30c are partly optically separated by a partition wall 42. Polarization filters 44 and 46, with polarization planes rotated by 90° with respect to one another, are attached above the openings 38 and 40 of the tube body 16.

The lens arrangement 24 formed in one piece is arranged above the tube body 16 such that a lens 48 is arranged above the tube opening 38 to bundle the light transmitted by the light source 26 and a lens 50 is arranged above the opening 40 to focus light received through the window 12 onto the sensor elements 30a, 30b and 30c.

A simple and accurate adjustment of the optical components during the assembly of the sensor is possible in that, on the one hand, the tube body 16 carries both the printed circuit board 22 with the light source 26 and the sensor elements 30a, 30b and 30c and the lens arrangement 24 and, on the other hand, the tube body 16 and the lens arrangement 24 are made in one piece.

When the optical sensor is used for a reflection light barrier with a reflector which changes the polarization plane of the incident light, light emitted by the light source 26 is delivered to the polarization filter 44 through the tube opening 38 such that polarized light is directed to the reflector through the lens 38 and the window 12 in accordance with the direction of the polarization filter. Light reflected there has a changed direction of polarization and enters into the optical sensor through the window 12 and is focused by the lens 50 onto the sensor elements 30a, 30b and 30c. In this connection, the light entering through the lens 50 passes through the polarization filter 46 which has a changed direction of polarization with respect to the polarization filter 44 so that only correspondingly polarized light reaches the sensor elements. In this way, scattered light, which has a different direction of polarization, is effectively filtered, which substantially increases the detection precision.

What is claimed is:

1. An optical sensor for use in high vacuum plants and/or in ultrahigh vacuum plants comprising
   a metal housing substantially impermeable to gas surrounding an interior space permitting a gas leak rate of less than $10^{-7}$ mbar·l/s, and having a window which transmits light;
   an optical sensor element arranged in the interior space for detecting the light which is incident through the window; and
   an electronic circuit connected to the optical sensor element and located in the interior space for processing signals provided by the sensor element.

2. An optical sensor in accordance with claim 1, wherein the window has a region of metallized glass soldered to the metal housing.

3. An optical sensor in accordance with claim 1, wherein the window and the metal housing we configured so that the window is self-sealing when the pressure in the interior space is higher than the pressure outside the metal housing.

4. An optical sensor in accordance with claim 1, including at least one of an image forming component and a filtering optical component arranged in the interior space between the window and the sensor element.

5. An optical sensor in accordance with claim 1, wherein the electronic circuit is arranged on a printed circuit board which is thermally connected to the metal housing for heat dissipation.

6. An optical sensor in accordance with claim 1, wherein the metal housing is made to be secured to a flange in a high vacuum plant or an ultrahigh vacuum plant while forming a thermal contact.

7. An optical sensor in accordance with claim 1, including one of a battery and an accumulator arranged in the interior space for supplying energy to the optical sensor.

8. An optical sensor in accordance with claim 1, including devices provided in the interior space for transmitting one of signals of the sensor element and signals of the sensor element emitted by the circuit to an exterior of the metal housing in a wireless manner.

9. An optical sensor in accordance with claim 1, including storage elements provided in the interior space for storing signals from one of the sensor element and the electronic circuit.

10. An optical sensor in accordance with claim 1, including components in the interior space resistant to temperatures during the heating of a vacuum plant or of an ultrahigh vacuum plant.

11. An optical sensor in accordance with claim 1, wherein the interior space is filled with an inert gas.

12. An optical sensor in accordance with claim 1, wherein the interior space is filled with a gas having a diffusion rate that is lower than the diffusion rate of nitrogen.

13. An optical sensor in accordance with claim 1, wherein the pressure in the interior space is less than 0.1 bar.

14. An optical sensor in accordance with claim 1, further comprising a light source in the interior space for the radiant emittance of light from the window.

15. An optical sensor in accordance with claim 14, further including a light source arranged in the interior space for the radiant emittance of light from a second window in the metal housing which is transparent to light of the light source.

16. An optical sensor in accordance with claim 14, including one of image forming components and filtering optical components arranged in the internal space between the window and the light source.

17. An optical sensor in accordance with claim 14, including at least one non-transparent partition wall in the interior space for at least partly optically separating a light path between the window and the sensor element and a light path between the window and the light source.

18. An optical sensor in accordance with claim 17, including a one-piece tube which at least partly optically separates the light paths.

19. An optical sensor in accordance with claim 14, including one of a one-piece image forming component and a filtering optical component for influencing light transmitted by the light source and light received by the sensor element.

20. An optical transmitter for use in high vacuum plants and/or in ultrahigh vacuum plants comprising
   a metal housing substantially impermeable to gas surrounding an inner space permitting a gas leak rate of less than $10^{-7}$ mbar·l/s, and having a window which transmits light; and
   a light source arranged in the internal space for the radiant emittance of light through the window.

* * * * *